(12) United States Patent
Palmer

(10) Patent No.: US 9,861,946 B1
(45) Date of Patent: Jan. 9, 2018

(54) REACTOR INLET VAPOR VELOCITY EQUALIZER

(71) Applicant: PHILLIPS 66 COMPANY, Houston, TX (US)

(72) Inventor: Brad P. Palmer, Fulshear, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 15/366,481

(22) Filed: Dec. 1, 2016

(51) Int. Cl.
  *B01J 8/02* (2006.01)
  *B01J 4/00* (2006.01)
  *B01J 8/06* (2006.01)

(52) U.S. Cl.
  CPC ............. *B01J 8/0278* (2013.01); *B01J 4/005* (2013.01); *B01J 8/065* (2013.01); *B01J 2208/0092* (2013.01); *B01J 2208/00548* (2013.01); *B01J 2208/00893* (2013.01); *B01J 2208/00929* (2013.01); *B01J 2208/00938* (2013.01)

(58) Field of Classification Search
  CPC .................. B01J 8/0278; B01J 8/0257; B01J 2208/00938; B01J 2208/00929; B01J 2208/0092; B01J 2208/00893; B01J 2208/00548; B01J 4/005
  See application file for complete search history.

(56) References Cited

U.S. PATENT DOCUMENTS 7,258,144 B2 * 8/2007 Barthod ................. B01J 8/0278
141/285

* cited by examiner

*Primary Examiner* — Lessanework Seifu
(74) *Attorney, Agent, or Firm* — Phillips 66 Company

(57) ABSTRACT

The invention relates to distributing reactants more evenly across the interior space of a reactor vessel utilizing a distributor at the inlet end that initially directs the flow of reactants through a flange plate and a series of ring plates. The ring plates are physical spaced such that vapor along the wall of the inlet is mildly obstructed by the flange plate and the ring plates cause the vapor to alter course temper down any diverse velocities that may create hot spots within the catalyst bed.

16 Claims, 7 Drawing Sheets

REACTOR INLET VAPOR VELOCITY EQUALIZER

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to reactor design and especially to the design of inlets to reactors.

BACKGROUND OF THE INVENTION

Reactors for converting reactants to desirable intermediates or final products come in many sizes and shapes. Chemical engineers spend many hours designing reactor systems to optimize reactor production considering pressure, temperature, flow rates, catalyst cost, reaction kinetics along with balancing many other issues and concerns.

It is commonly understood that a generally uniform distribution of reactants in a catalyst reactor is preferred to avoid hot spots and to avoid the underutilization of catalyst in the reactor. Many inlet designs have been created to improve the distribution of reactants within reactors especially where the reactants are vapor versus liquid. For purposes of this invention, gas and vapor mean the same thing and are generally expressed with the term vapor. One problem with distribution of vapor is that such vapors tend to have higher velocity concentrations away from the center, such as when vapors follow a bend in the piping leading to a reactor. In a reactor arrangement that is fed by a conduit with a significant bend leading into the top or bottom of a reactor, the higher velocities tend to follow the outside of the bend and concentrate along one side of the reactor. Baffles and vanes have been used for years to create back pressure on the inlet stream and cause the reactants to distribute themselves across the reactor. But back pressure concerns and velocity loss are always concerns that counter any efforts at creating an even and balanced flow. Reducing the productivity of a reactor is not part of an attractive solution.

Another common technique is to provide an inert support bed with a thick layer of inert material that create many tortuous paths to the catalyst causing mixing and back pressure to create a level of balance across the body of the reactor. Again, this type of solution creates back pressure and velocity loss and also reduces the available volume of a reactor for catalyst. Committing extra interior space in a reactor for inert material also reduces catalyst performance and the productivity of the system.

What is desired is a technique for creating a balanced distribution of the vaporous reactants across the interior space of a reactor without significantly enlarging the size of the reactor and without impairing the productivity of the reactor system.

BRIEF SUMMARY OF THE DISCLOSURE

The invention more particularly relates to a reactor system including a reactor vessel including a closed shell defining a relatively large interior space inside the shell for conducting a fixed bed catalytic reaction. The reactor includes an inlet into the interior space of the shell for the admission of reactants and an outlet at the opposite end thereof to allow products of the catalytic reaction to exit the reactor vessel. The inlet includes a generally cylindrical neck having a smaller internal cross sectional dimension as compared to a comparable internal cross sectional dimension of the relatively large interior space within the shell of the reactor vessel. The generally cylindrical neck includes a bottom adjacent the interior space and a top spaced away from the interior space such that the generally cylindrical neck has a relatively consistent cross sectional area from the top to the bottom. A feed conduit is connected to the generally cylindrical neck and arranged to provide a gaseous feedstock to the generally cylindrical neck and into the interior space wherein the feed conduit includes a bend near the cylindrical neck such that the flow of the gaseous feedstock changes direction of flow by about 90 degrees or more within the feed conduit shortly prior to entering the cylindrical neck. A reactor inlet velocity equalizer is positioned generally within the generally cylindrical neck which includes a flange equalizer plate near the top of the generally cylindrical neck of the reactor vessel and longitudinal vanes attached to the flange equalizer plate and extending toward the bottom of the generally cylindrical neck. At least three sets of cross vanes are arranged to connect between the longitudinal vanes and extend generally transversely across the generally cylindrical neck. The equalizer further includes a top equalizer plate attached to a first set of the cross vanes to minimally obstruct flow of gaseous feedstock while being positioned below the flange equalizer plate within the generally cylindrical neck. A middle equalizer plate is attached to a second set of the cross vanes to also minimally obstruct flow of gaseous feedstock and is positioned below the top equalizer plate within the generally cylindrical neck. A bottom equalizer plate is attached to a third set of the cross vanes to minimally obstruct flow of gaseous feedstock and is also positioned below the middle equalizer plate and still within the generally cylindrical neck. A fixed catalyst bed is positioned within the interior space of the shell for the gaseous reactants to be converted to desirable products where the reactor inlet velocity equalizer is arranged to interfere with high velocity gaseous flows more than it interferes with lower velocity flows such that flow that may otherwise be uneven across the neck is altered by the reactor inlet velocity equalizer to create more balanced velocities across the neck and therefore the fixed catalyst bed for more even use of the catalyst bed within the shell.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
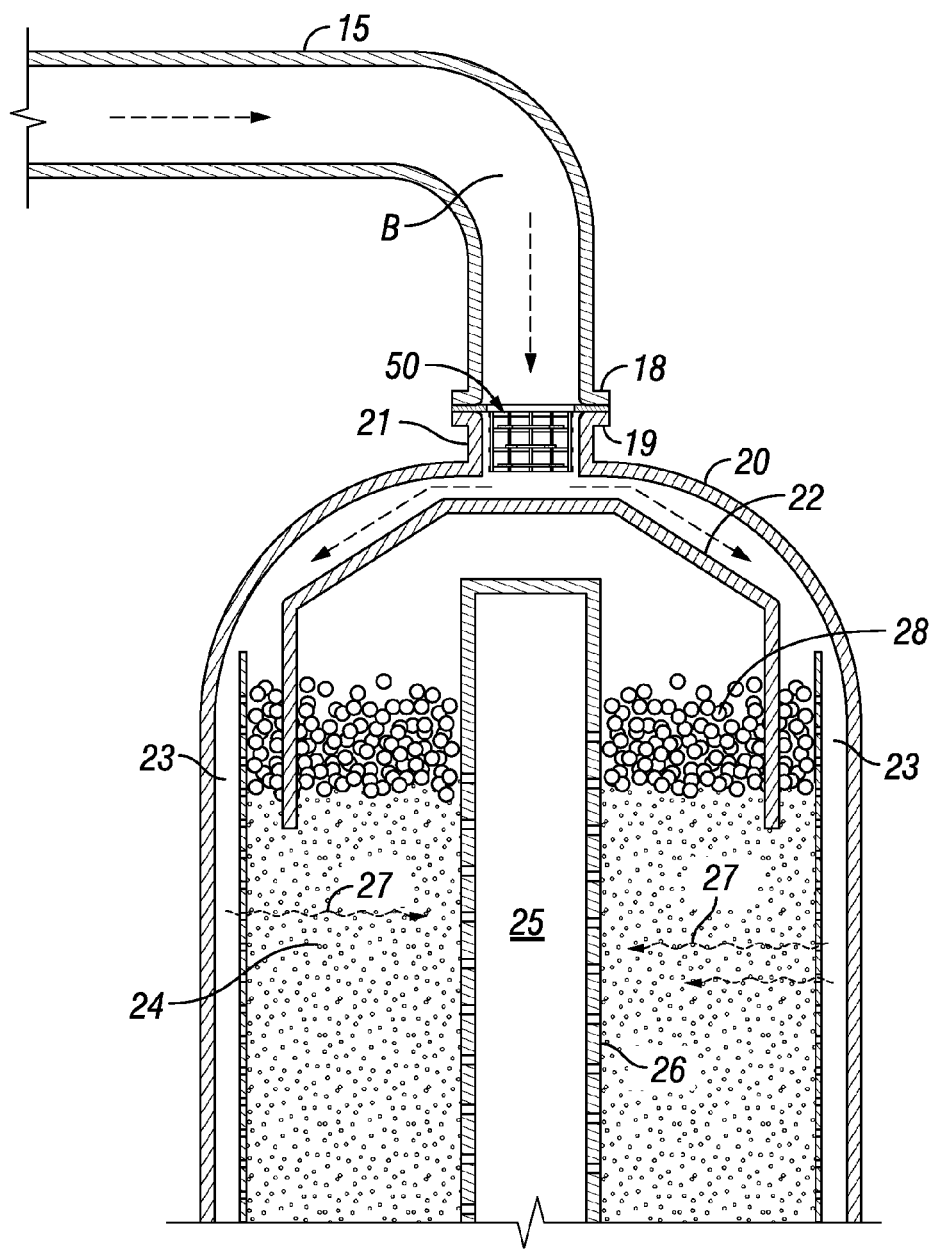
FIG. 1 is a front elevation cross-section view of a reactor with the inventive equalizer in place just inside the inlet neck of the reactor.
Figure 2:
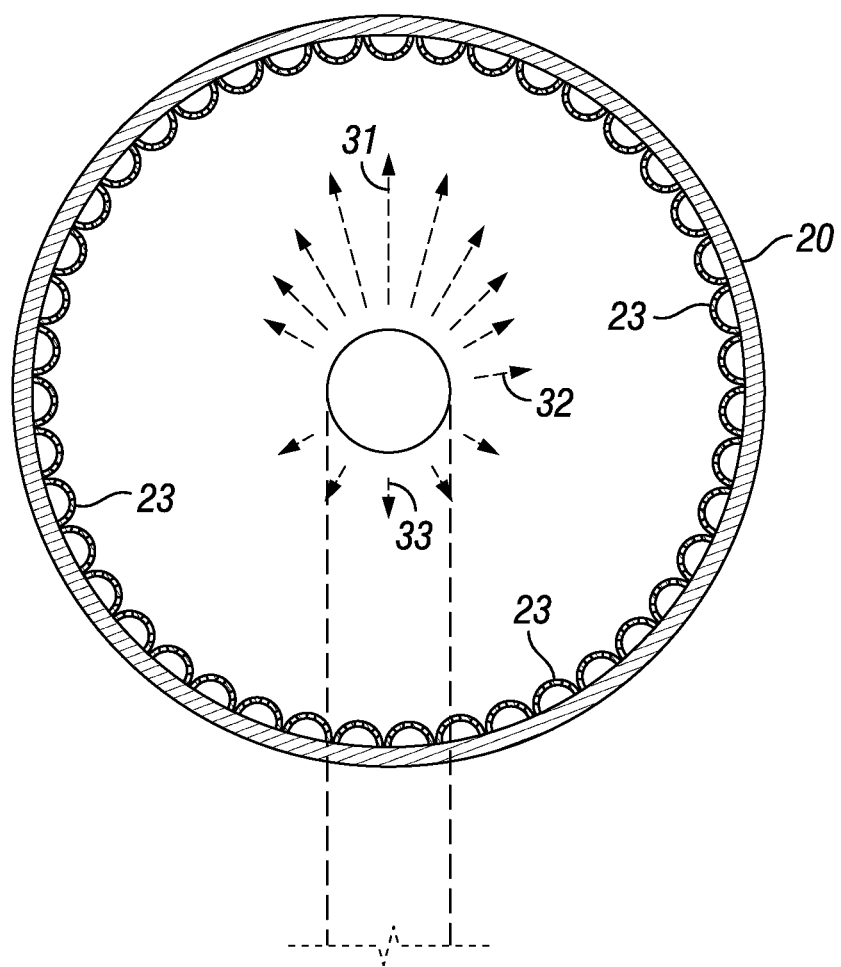
FIG. 2 is a top view of the reactor shown in FIG. 1 showing the relative velocity of the inlet stream entering the reactor without the inventive equalizer.

An example reactor system 10 is shown FIG. 1. The reactor vessel 20 is fed a stream of vapor (gas and vapor are synonymous for this present invention) from source S through a conduit 15. The vapor from source S enters at the top of the reactor vessel 20 at a generally cylindrical inlet neck 21 and impacts the catalyst cover 22 and spreads out to the periphery of the reactor vessel 20 to enter into inlet channels 23. Inlet channels 23 are best seen in FIG. 2 where they appear to be half pipes with porous walls situated side by side along the periphery of the reactor vessel 20. The inlet channels 23 have perforations (not shown) facing into the catalyst bed 24 so that the vapor may emanate from the inlet channels generally horizontally through the catalyst bed 24 as shown by wavy arrow 27 through perforations in the outlet conduit 26 and into core space 25. The outlet conduit 26, like the inlet channels 23, has perforations that allow vapor to pass through but prevent catalyst from passing through. The gasses undergo a catalytic conversion in the catalyst bed 24 as the gasses follow a path shown as 27 there through. The catalyst bed 24 is comprised of particles or extrudates or other solids of various shapes that may be poured into place between the inlet channels 23 and the outlet conduit 26. Inert support material 28 is positioned over the bed of catalyst 24 to hold down the catalyst and prevent it from fluidizing at the top of the catalyst bed 24.

The problem addressed by the present invention is where the uneven distribution of vapor occurs in the top of the reactor vessel 20. The inertia of the vapor moving through inlet conduit 15 around the bend B creates higher velocity vapor around the outside of the bend B as compared to the center of the conduit 15 and neck 21 or along the inside of the bend B. Preferably, the vapor would have a consistent velocity as measured transversely across the neck 21, or at least the velocity would be concentric around the center or axis of the generally inlet neck 21 so that as the vapor spreads out over the catalyst cover 22, the vapor enters all of the inlet channels 23 at about the same velocity. In higher velocity flow designs (or systems), the vapor attains unbalanced velocity as shown in FIG. 2 where longer arrows 31 indicate the higher velocities while shorter arrows 33 show much slower velocity gas. Ideally, the arrows 31, 32, and 33 would be equal length meaning that the vapor flow is equal in all directions. If the flow is equal, all of the catalyst in the catalyst bed 24 is used equally and ages equally. As such, the catalyst in the high velocity areas are used up before the catalyst at the low velocity areas are used at all. In some reactors, low velocity causes excessive coking. Ultimately, productivity of the vessel is lower than optimal meaning lost production and lost profit opportunity. Any operational tricks that may be employed to increase productivity of aging catalyst are frustrated by the rapid aging of some catalyst while other catalyst is still quite fresh. Since catalyst tends to be expensive, getting as much productivity of desired products from a load of catalyst is always preferred.

Turning back to FIG. 1 and also to FIGS. 3-7, Equalizer 50, embodying the features of the present invention, is installed in the generally cylindrical neck 21 of the reactor vessel 20 to help balance the velocity across the transverse dimension seen at the flange 19 and better balanced before the gases enter the main volume of the vessel 20. In other installations where there is more room above the catalyst cover plate 22, a distributor may be installed to provide some balancing, but with virtually no room to spare, the equalizer 50 is positioned within the generally cylindrical neck 21.

Figure 3:
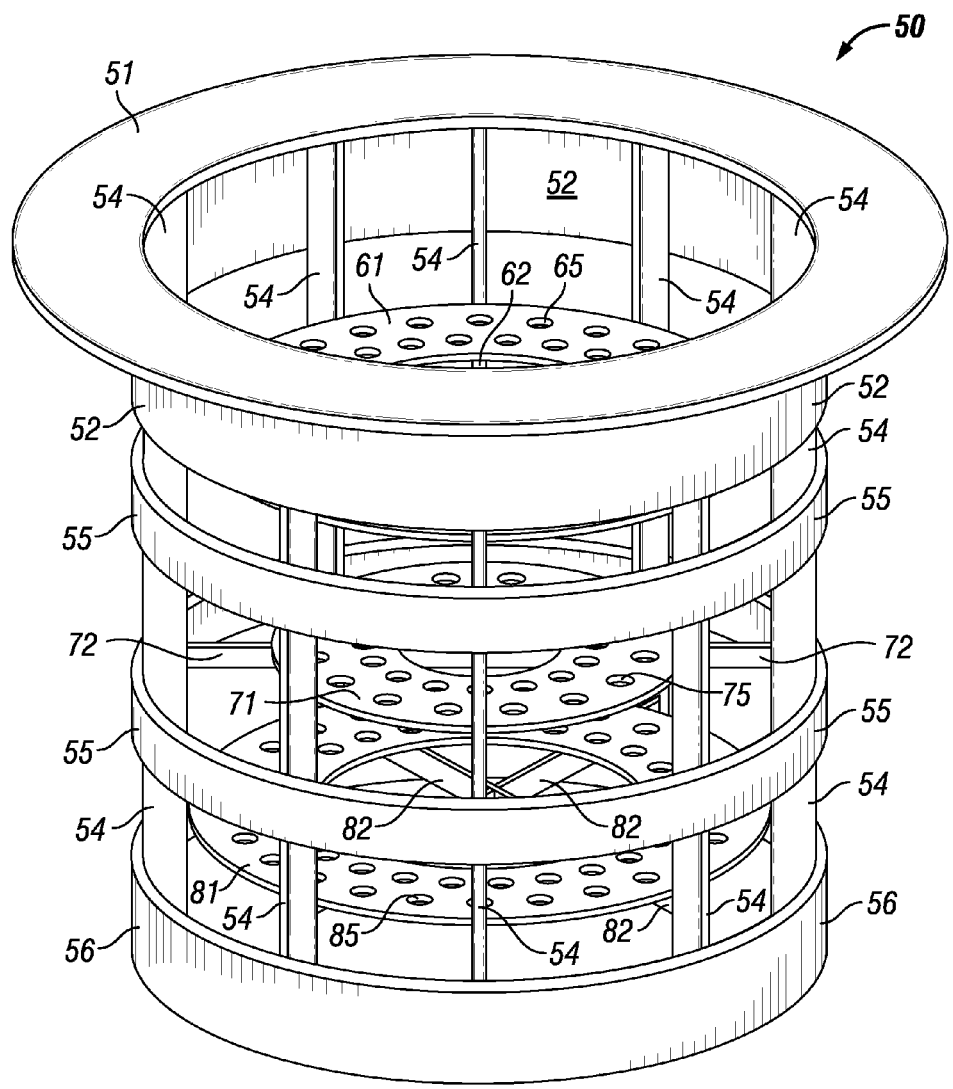
FIG. 3 is a perspective view of an embodiment of the inventive equalizer illustrating the structural elements for equalizing the flow of the inlet gases to a reactor.
Figure 4:
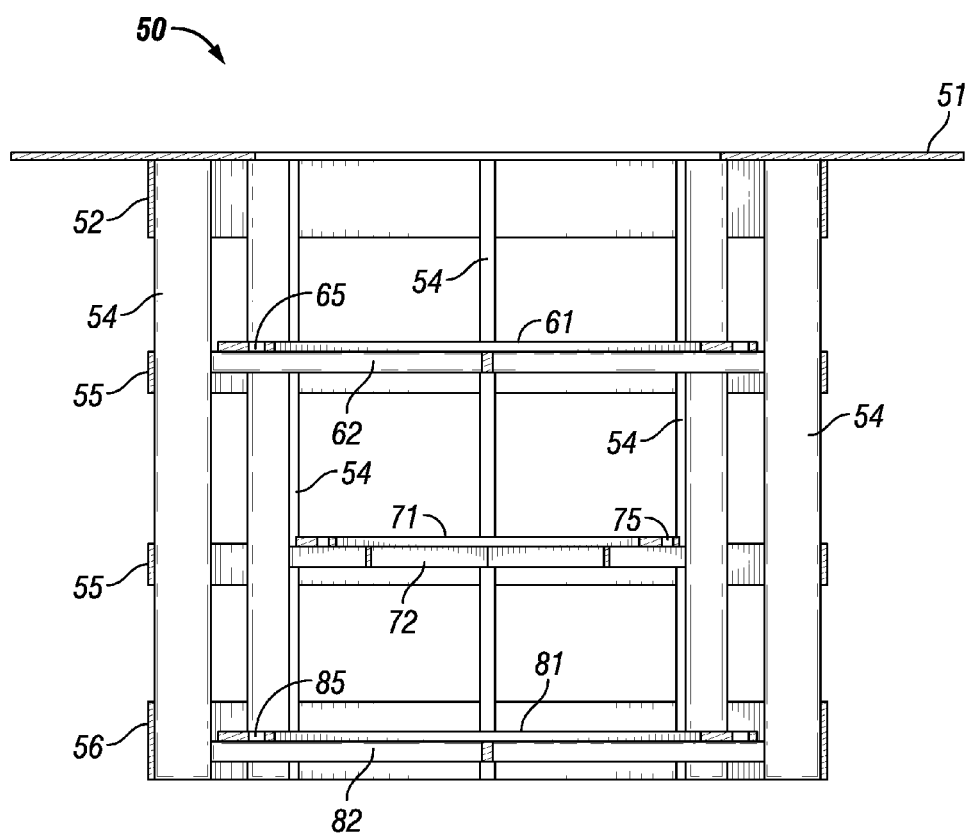
FIG. 4 is an elevation cross section of the inventive equalizer providing further illustration to the structure for equalizing the flow of inlet gases to a reactor.
Figure 5:
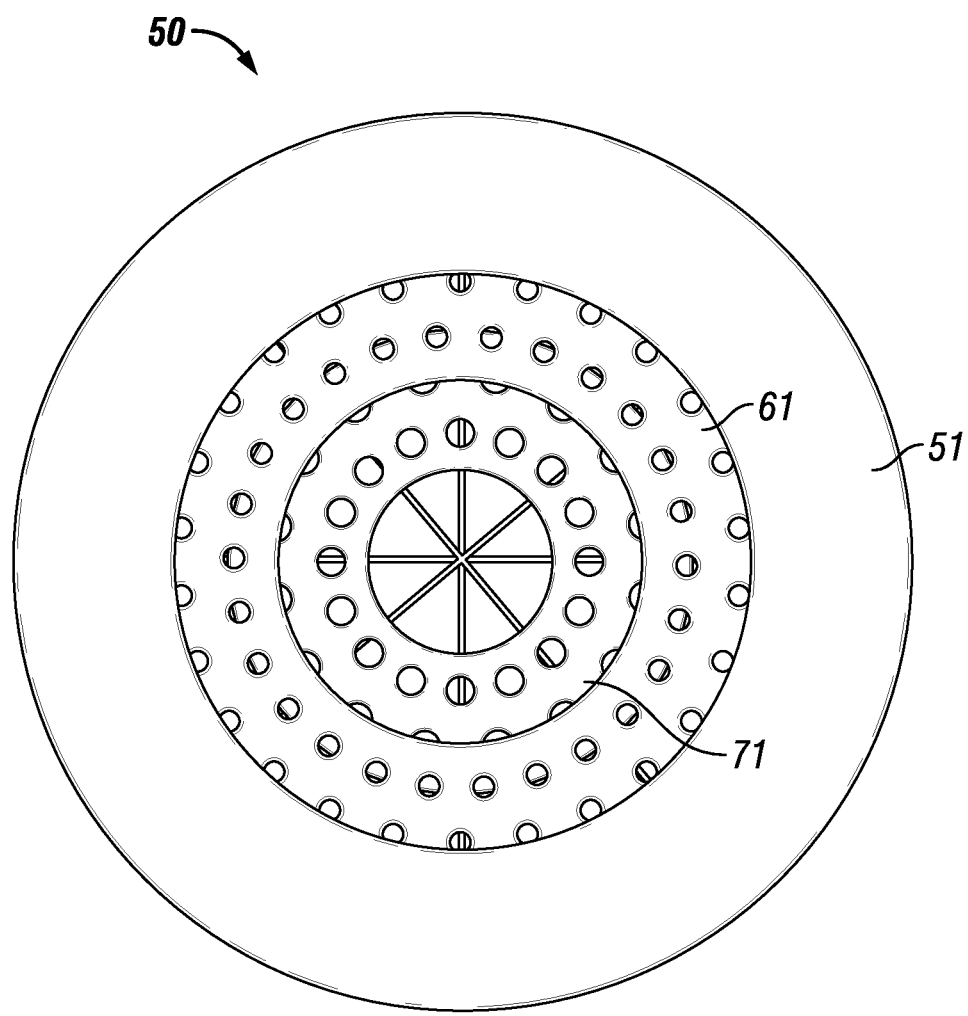
FIG. 5 is a top perspective view of the inventive equalizer providing further illustration of the structural elements for equalizing the flow of the inlet gases to a reactor.
Figure 6:
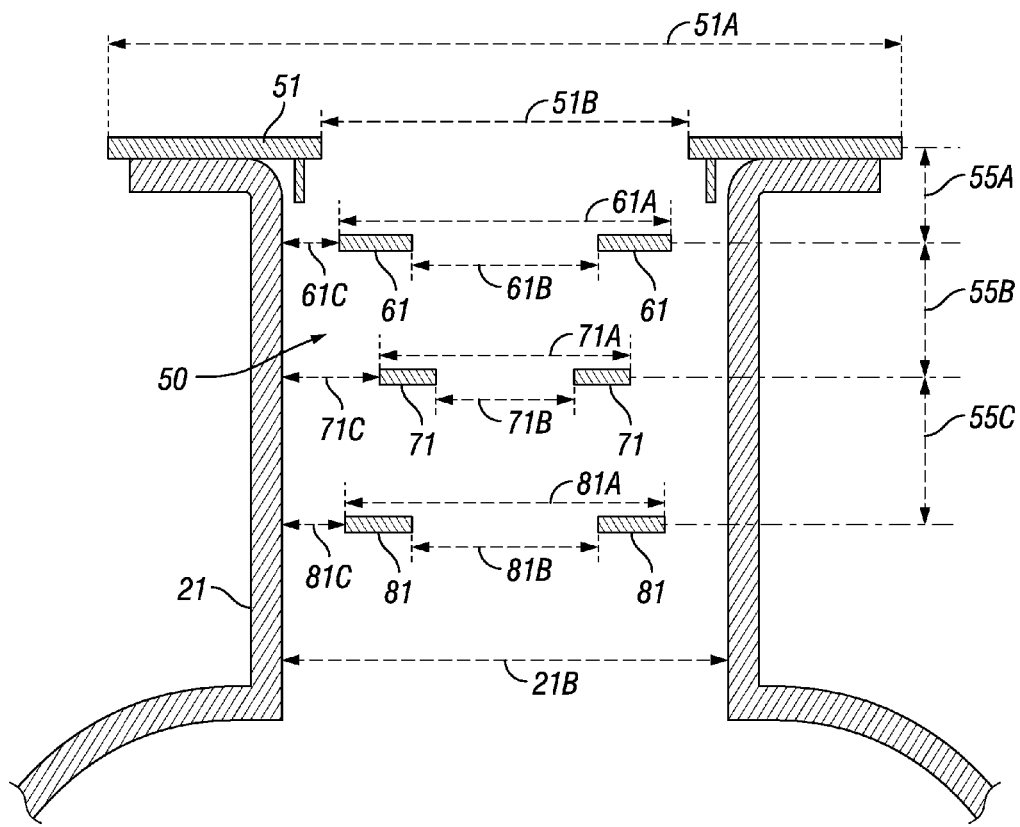
FIG. 6 is a fragmentary elevational cross section of the inventive equalizer showing the relative dimensions of the components.

The equalizer 50 is best shown in FIGS. 3, 4 and 5. The equalizer 50 ideally imposes minimal resistance of the flow of the vapor into the reactor vessel 20 so as to not alter the intended catalyst process while getting better distribution to utilize the full size and catalyst load in the reactor vessel 20. So, the key features of the inventive equalizer 50 are a flange plate 51 and three vertically spaced ring plates 61, 71 and 81 (that will be described shortly).

Flange plate 51 is positioned generally between the flange 18 of the conduit and the flange 19 of the generally cylindrical neck 21. The flange plate 51 includes a large diameter 51A so as to extend into the space between the flanges 18 and 19 and particularly includes a generally circular opening in the middle thereof to allow vapor into the generally cylindrical neck 21. The generally circular opening is indicated by dimension 51B which is the diameter of the generally circular opening. The generally circular opening of flange plate 51 is preferably less than the diameter 21B of the generally cylindrical neck to as to create an obstruction to the flow of vapors along the interior walls of the inlet conduit 15. As seen in the Figures, the outer diameter 51A of the flange plate 51 is larger than the diameter 21B of the generally cylindrical neck. It is believed that the flange plate 51 creates a greater obstruction for a higher velocity flow of vapor than it does for a lower velocity flow of vapor. As such, the flange plate 51 provides a first obstruction to begin to balance to velocity differences coming into the generally cylindrical neck 21.

Equalizer 50 further includes a flange collar 52 that is attached to and extends from the flange plate 51 down into the generally cylindrical neck 21, but with a diameter slightly smaller than the diameter 21B of the generally cylindrical neck 21. A number of longitudinal vanes 54 are attached to the inside surface of the flange collar 52 and arranged to extend both further into the center of the generally cylindrical neck 21 and further longitudinally into the generally cylindrical neck 21 toward the open interior of the reactor vessel 20. The longitudinal vanes 54 are intended to create little if any obstruction to the flow of vapor along the generally cylindrical neck 21, but rather to be used as an element of the structural support for the spaced ring plates 61, 71 and 81.

In the preferred arrangement, eight longitudinal vanes 54 are attached to the interior of the flange collar 52 and distributed equidistant around the flange collar 52. Attached to the longitudinal vanes 54 are cross vanes 62, 72 and 82 each set of cross vanes arranged to extend transversely across the generally cylindrical neck 21. The first set of cross vanes are top cross vanes 62 which are positioned at a first position below the flange plate 51. In the preferred arrangement, two cross vanes 62 are attached by their ends to each of four longitudinal vanes 54 forming an "X" shape generally horizontal or transversely across the generally cylindrical neck 21. Similarly, the second set of cross vanes are middle cross vanes 72 and are position at a second position below top cross vanes 62. Again, in the preferred arrangement, middle cross vanes 72 are attached at their ends to four longitudinal vanes 54, but to the four longitudinal vanes 54 that are not attached to the top cross vanes 62. Also similarly, the third set of cross vanes are bottom cross vanes 82 and are positioned below middle cross vanes 72. Again in the preferred arrangement, bottom cross vanes 82 are attached by their ends to four longitudinal vanes 54 which are the same four longitudinal vanes 54 that support the top cross vanes. All of the cross vanes 62, 72 and 82 are intended to support the spaced ring plates 61, 71, and 81, but not, by themselves, have much impact on the flow of vapor through the generally cylindrical neck 21. It should be noted that in some circumstances, such as for large diameter vessels or very high flow rates, it may be desirable to provide four cross vanes with ends of each attached to the eight longitudinal vanes to support each of the spaced ring plates 61, 71 and 81.

Top ring plate 61 is mounted on the "X" shaped top cross vanes 62. Preferably, the top ring plate 61 is relatively flat, having a thickness of less than 0.5 inches with an outer diameter 61A and an inner diameter 61B. The outer diameter 61A is less than the inner diameter 21B of the generally cylindrical neck 21 spaced away from the inner wall of generally cylindrical neck 21 by an annular space 61C. Ideally, the top ring plate 61 is a perfect circle with a perfectly circular opening in the middle that is also perfectly concentric to the circular shape. The difference between the inner diameter 61B and outer diameter 61A gives a ring face area. A greater ring face area tends to increase the obstruction to vapor flow and reduced ring face area similarly creates less obstruction to the vapor flow. In one preferred arrangement, top ring plate 61 includes a series of small holes 65 to reduce total ring face area. The amount of pressure drop created by top ring 61 is complicated in that there are many inputs to be considered such as the velocity of the vapor, the density and viscosity of the vapor, the ring face area and the turbulence that will be created by the size and shape of the ring face area, and even the thickness of the top ring plate 61. But the holes 65 provide an additional design option for creating a desired pressure drop for the flow of vapor where a small but non-zero pressure drop may be imposed in a manner that impedes high velocities at the outside walls of the conduit 15 and neck 21 and thereby balance asymmetrically distributed velocities of vapor in such spaces. While it is desirable to obtain uniform velocity across the neck as the vapor enters the interior space of the reactor 20, this present invention is focused on making the velocity profile more symmetrically balanced around the axis of the neck. So, for each coaxial ring around the axis of the neck 21 at the bottom end thereof has a fairly consistent velocity of vapor all the way around that particular ring, and all such rings have fairly consistent velocity as compared to the same analysis before the vapor passes through the equalizer 50. This allows that two different rings may have different velocities, but the variation is from one ring to another and not within a ring defined at any distance from the center axis of the neck 21.

Middle ring plate 71 is similarly mounted on top of the "X" shaped middle cross vanes 72. Preferably, the middle ring plate 71 is also relatively flat, having a thickness similar to the top ring plate 61 with an outer diameter 71A and an inner diameter 71B. The middle ring plate 71 is smaller than the top ring plate 61 such that the outer diameter 71A of middle ring plate 71 is less than the outer diameter 61A of the top ring plate 61. While the outer diameter 71A of the middle ring plate 71 may be larger, about the same size as, or smaller than the inner diameter 61B of the top ring 61 but it is preferred that the outer diameter 71A of the middle ring plate 71 is about the same as or less than the inner diameter 61B of the top ring plate 61. In one preferred arrangement, middle ring plate 71 includes a series of small holes 75 to reduce total ring face area of middle plate 71.

Bottom ring plate 81 is similarly mounted to the top of the "X" shaped top cross vanes 82. Preferably, the bottom ring plate 81 is also relatively flat, having a thickness like the top ring plate 61 and middle ring plate 71. The bottom ring plate 81 has an outer diameter 81A and an inner diameter 81B. The bottom ring plate 81 is larger than the middle ring plate 71 such that the outer diameter 81A of the bottom ring plate 81 is larger than the outer diameter 71A of the middle ring plate 71 and actually where the inner diameter 81B of the bottom ring plate 81 is about the same dimension as the outer diameter 71A of the middle ring plate 71. In various embodiments, the inner diameter 81B of the bottom ring plate 81 is about the same dimension or less than the outer diameter 71A of the middle ring plate 71. In another further option, middle ring plate 71 includes a series of small holes 75 to reduce total ring face area of middle plate 71.

Each of the flange plate 51 and ring plates 61, 71 and 81 are sized and arranged to create an obstruction to vapor flow through the generally cylindrical neck 21. But the obstruction is intended and designed to impose a limited restriction or pressure drop so as not to alter the underlying design parameters of the reactor system, but only create a better velocity balance of the vapor inlet flow across the full transverse dimension of the generally cylindrical neck 21. So, some pressure drop is desired and, ideally the pressure drop is at least 0.025 pounds per plate and less than about 0.25 pounds of pressure drop at each plate. It is believed that optimal results are created when the total pressure drop created by the equalizer 50 is between 0.25 and 0.75 pounds. The number and diameter of the holes 65, 75 and 85 in ring plates 61, 71 and 81 that allow vapor to pass through each of the ring plates 61, 71, and 81 effect the pressure drop along with the overall sizes of the plates including the thickness of each plate. It should also be recognized that the gas hourly space velocity of the vapor, the density and viscosity of the vapor and pressure of the vapor are generally established for a reactor system, but will also have a significant effect on pressure drop across the plates.

Figure 7:
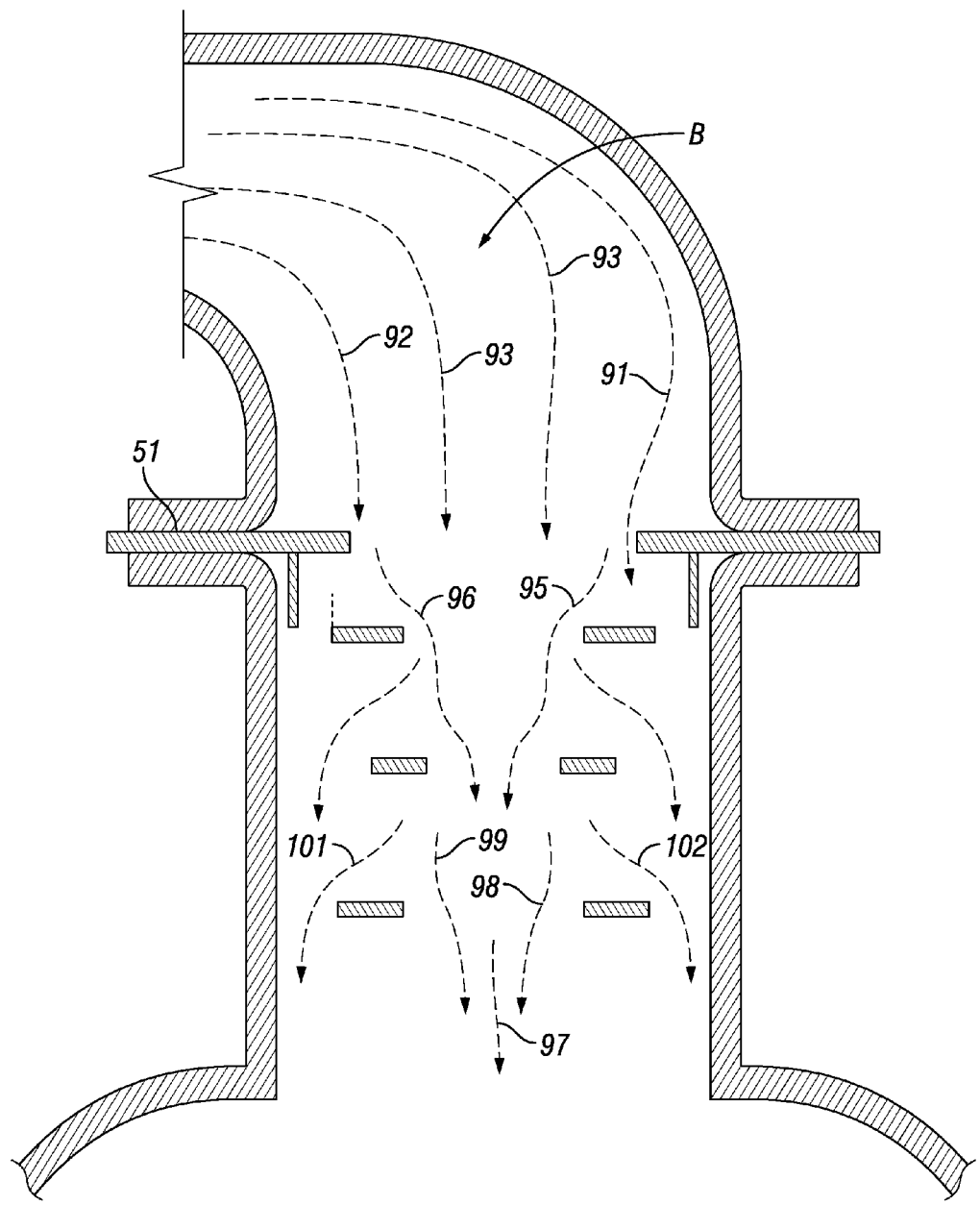
FIG. 7 is a fragmentary elevational cross section of the inventive equalizer showing the flow paths of the vapor into and through the neck of the reactor as altered by the inventive equalizer.

Turning now to FIG. 7, where arrows show the expected flow into and through the generally cylindrical neck 21. Arrow 91 shows the highest of all vapor velocities due to the bend B concentrating the flow along the outer wall of the conduit 15. One of the functions of the equalizer 59 is to impede the higher velocity flows and the flow at arrow 91 is impeded by the flange plate 51 deflecting that flow back toward the center or axis of the generally cylindrical neck 21. While the flange plate 51 would also impede flow at arrow 92, but since flow in that part of the conduit 15 is slower, the flow of vapor is not expected to slow as much from its peak velocity as the flow of vapor at arrow 91 will slow from its peak velocity. Flows 93 nearer to the center or axis of the conduit 15 are not very impacted by the flange plate 51. Each of the successive ring plates forces or causes flow of vapor to deviate around or be partially obstructed by the successive ring plates such that the only substantially flow path of nearly linear flow is through the center or along the axis of the generally cylindrical neck 21. Flow outside of about the center 20% to 25% of the cross sectional area of the generally cylindrical neck is at least partially obstructed to reduce or temper down the high velocity flows such that at the bottom of the generally cylindrical neck 21, the flow is generally equalized or caused to be more symmetrical. It should be noted that flows 95 and 96 are successively obstructed by the top and middle equalizer rings and that flow that ends up along the outer wall of the neck 21 such as indicated by arrows 101 and 102 have had some obstruction before it can get back to the outer wall. With all of these alterations of the flow without creating excessive back pressure or pressure drop, the performance of the reactor system is expected to be improved with longer run time, more efficient use of the catalyst, and higher productivity.

It should be understood that while this equalizer 50 may be used as a standalone distributor such as shown in the drawings of the present invention, it is also expected to improve the performance of other known distributors for reactor inlets in that balancing the velocity of vapor across the neck will improve the distribution of vapor below the neck. The equalizer of the present invention will enhance the performance of other distributor designs.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A reactor system comprising:
   a) a reactor vessel including a closed shell defining a relatively large interior space inside the shell for conducting a fixed bed catalytic reaction, an inlet into the interior space of the shell for the admission of reactants and an outlet at the opposite end thereof to allow products of the catalytic reaction to exit the reactor vessel, wherein the inlet includes a generally cylindrical neck having a smaller internal cross sectional dimension than a comparable internal cross sectional dimension of the relatively large interior space within the shell of the reactor vessel, wherein the generally cylindrical neck has a bottom adjacent the interior space and a top spaced away from the interior space such that the generally cylindrical neck has a relatively consistent cross sectional area from the top to the bottom;
   b) a feed conduit connected to the generally cylindrical neck and arranged to provide a gaseous feedstock through the feed conduit to the generally cylindrical neck and into the interior space wherein the feed conduit includes a bend near the cylindrical neck such that the flow of the gaseous feedstock changes direction of flow by about 90 degrees or more within the feed conduit shortly prior to entering the cylindrical neck;
   c) a reactor inlet velocity equalizer positioned generally within the generally cylindrical neck, wherein the equalizer comprises a flange equalizer plate positioned near the top of the generally cylindrical neck of the reactor vessel, longitudinal vanes attached to the flange equalizer plate and extending toward the bottom of the generally cylindrical neck, at least three sets of cross vanes connecting between the longitudinal vanes and extending generally transverse across the generally cylindrical neck, a top equalizer plate attached to a first set of the cross vanes to minimally obstruct flow of gaseous feedstock and positioned below the flange equalizer plate within the generally cylindrical neck, a middle equalizer plate attached to a second set of the cross vanes to minimally obstruct flow of gaseous feedstock and positioned below the top equalizer plate within the generally cylindrical neck, and a bottom equalizer plate attached to a third set of the cross vanes to minimally obstruct flow of gaseous feedstock and positioned below the middle equalizer plate and still within the generally cylindrical neck; and
   d) a fixed catalyst bed within the interior space of the shell for the gaseous reactants to be converted to desirable products where the reactor inlet velocity equalizer is arranged to interfere with high velocity gaseous flow more than it interferes with lower velocity flows such that flow that may otherwise be uneven across the neck is altered by the reactor inlet velocity equalizer to create more balanced velocities across the neck and therefore the fixed catalyst bed for more even use of the catalyst bed within the shell.

2. The reactor vessel set forth in claim 1 wherein the flange equalizer plate has an outer diameter and an inner diameter such that the inner diameter defines a central hole through the flange equalizer plate and wherein the outer diameter of the flange equalizer plate is at least as large as the internal cross sectional dimension of the generally cylindrical neck, the inner diameter of the flange equalizer plate is smaller than the internal cross sectional dimension of the generally cylindrical neck and the flange equalizer plate effectively restricts the cross sectional area of the generally cylindrical neck by at least 5%.

3. The reactor vessel set forth in claim 2 wherein the flange equalizer plate restricts the cross sectional area of the neck by at least 10%.

4. The reactor vessel set forth in claim 3 wherein the flange equalizer plate restricts the cross sectional area of the neck by at least 15%.

5. The reactor vessel set forth in claim 2 wherein the top equalizer plate has an outer diameter and an inner diameter such that the inner diameter defines a central hole through the top equalizer plate and wherein the outer diameter of the top equalizer plate is less than the inner diameter of the generally cylindrical neck by at least 10% of the inner diameter of the generally cylindrical neck and wherein the inner diameter of the top equalizer plate is at least 50% of the diameter of the generally cylindrical neck.

6. The reactor vessel set forth in claim 5 wherein the top equalizer plate has an outer diameter and an inner diameter and wherein the outer diameter of the top equalizer plate is about the same as the diameter of the inner diameter of the flange equalizer plate.

7. The reactor vessel set forth in claim 6 wherein the outer diameter of the top equalizer plate is less than the inner diameter of the generally cylindrical neck by at least 15% of the inner diameter of the generally cylindrical neck.

8. The reactor vessel set forth in claim 7 wherein the outer diameter of the top equalizer plate is less than the inner diameter of the generally cylindrical neck by at least 20% of the inner diameter of the generally cylindrical neck.

9. The reactor vessel set forth in claim 6 wherein the middle equalizer plate has an outer diameter and an inner diameter and wherein the outer diameter of the middle equalizer plate is about the same as the inner diameter of the top equalizer plate.

10. The reactor vessel set forth in claim 9 wherein the bottom equalizer plate has an outer diameter and an inner diameter and wherein the inner diameter of the bottom equalizer plate is about the same as the outer diameter of the middle equalizer plate.

11. The reactor vessel set forth in claim 5 wherein the top equalizer plate has an outer diameter and an inner diameter and wherein the outer diameter of the top equalizer plate is greater than the diameter of the inner diameter of the flange equalizer plate.

12. The reactor vessel set forth in claim 11 wherein the middle equalizer plate has an outer diameter and an inner diameter and wherein the outer diameter of the middle equalizer plate is greater than the inner diameter of the top equalizer plate.

13. The reactor vessel set forth in claim 12 wherein the bottom equalizer plate has an outer diameter and an inner diameter and wherein the inner diameter of the bottom equalizer plate is less than the outer diameter of the middle equalizer plate.

14. The reactor vessel set forth in claim 1 wherein each of the cross vanes are at least four inches apart along the length of the generally cylindrical neck so that the top plate is at least 4 inches from each of the flange plate and middle equalizer plate and the bottom plate is at least 4 inches from the middle equalizer plate.

15. The reactor vessel set forth in claim 14 wherein the spacing between the flange plate and the equalizer plates are equidistant from one another.

16. The reactor vessel set forth in claim 1 wherein each of the equalizer plates include holes therethrough to allow vapor to flow through each of the equalizer plates rather than around the outer diameter or through the inner diameter but through holes in the plates and thereby reduce the effective dimension of the obstruction created by each of the equalizer plates and provide an additional design approach to obtain a desired pressure drop at each equalizer plate.

\* \* \* \* \*